United States Patent

[11] 3,563,231

[72] Inventors Behrman A. Ducote
Richardson;
Lawrence V. Nicastro, Irving, Tex.
[21] Appl. No. 802,753
[22] Filed Feb. 19, 1969
Continuation of Ser. No. 586,508,
Oct. 13, 1966.
[45] Patented Feb. 16, 1971
[73] Assignee Tracor Inc.
Austin, Tex.
a corporation of Texas

[54] ELECTRONYSTAGMOGRAPH CONTROL SYSTEM
5 Claims, 1 Drawing Fig.
[52] U.S. Cl. .................................................... 128/2.1
[51] Int. Cl. ....................................................... A61b 5/10
[50] Field of Search .......................................... 128/2, 2.1

[56] References Cited
UNITED STATES PATENTS
| | | | |
|---|---|---|---|
| 2,902,030 | 9/1959 | Kennedy et al. | 128/2.1 |
| 3,000,271 | 9/1961 | Harvey et al. | 128/2.1 |
| 3,029,808 | 4/1962 | Kagan | 128/2.1X |
| 3,217,706 | 11/1965 | Sullivan | 128/2.1 |

*Primary Examiner*—William E. Kamm
*Attorney*—Arnold, Roylance, Kruger and Durkes

ABSTRACT: An electronystagmograph including a system for irrigating the subject's ear with hot or cold water to cause nystagmus, sensors for measuring the potential in the vicinity of the subject's eyes, 2-channel recording means, and a timing system for controlling a valve in the water supply for establishing the irrigation interval and energizing one recording channel to record the duration of the irrigation interval and, at the end of the irrigation interval, to energize the second channel to record the potential detected by the sensors during a subsequent measuring interval.

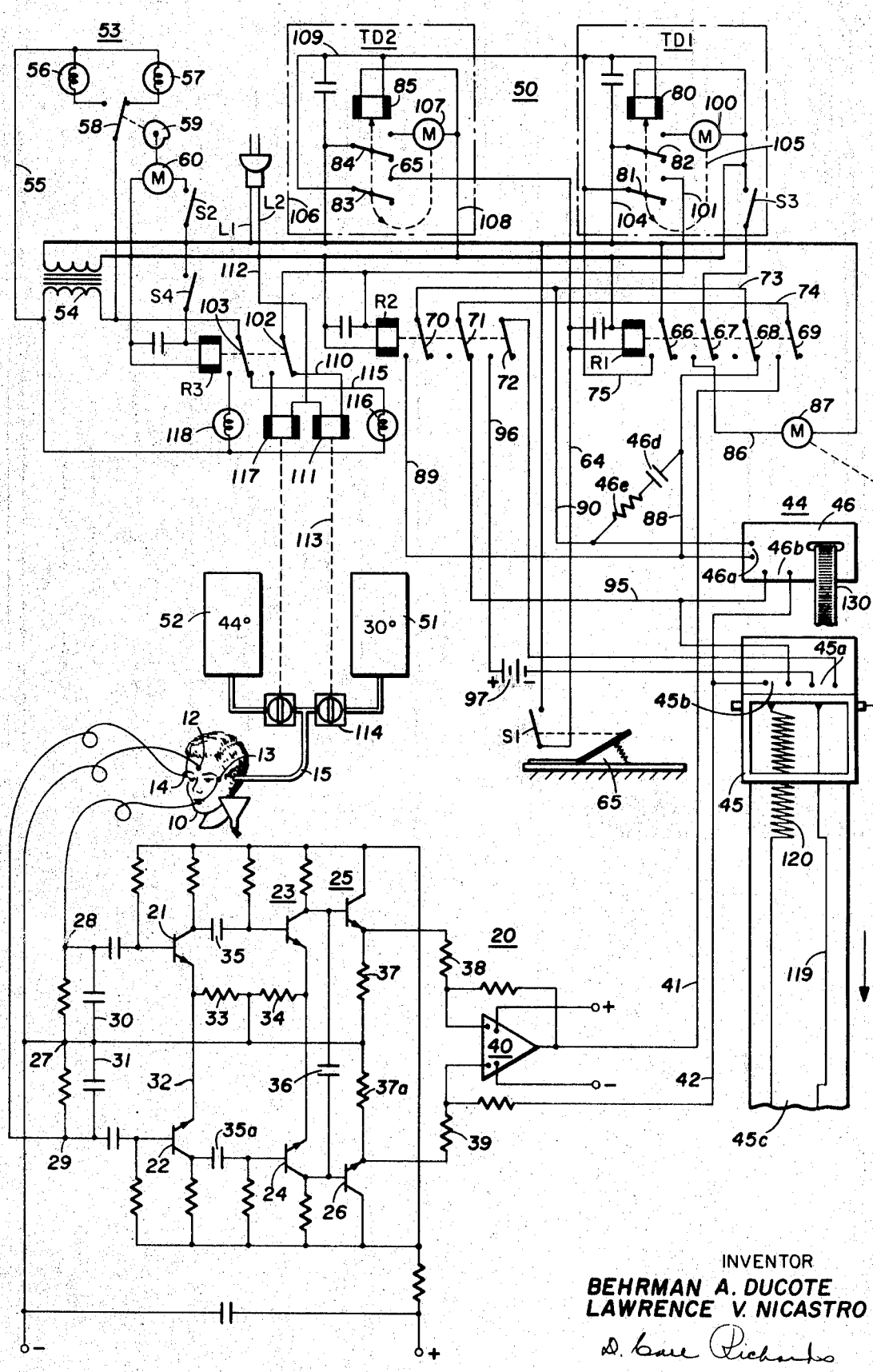

ELECTRONYSTAGMOGRAPH CONTROL SYSTEM

This application is a continuation of application No. 586,508 filed Oct. 18, 1966 and now abandoned.

This invention relates to an electronystagmograph, and more particularly to a system for automatically controlling the irrigation periods and the recording of the effects of irrigation with fluids of selectively variable temperature on the inner ear of a subject.

Electronystagmography is a method of testing individuals for the ability of the inner ears to detect movement of the fluid therein and for the ability of the nerves interconnecting the inner ear and the central nervous system to relay the stimuli sensed. The tests are helpful to diagnose disorders of equilibrium, both as to location and gravity. Electronystagmograph measurements are based on the fact that irrigating the ear canal with a liquid warmer or cooler than body temperature effects a displacement of the fluid in the inner ear. This causes the eyes repeatedly to move away from and abruptly back to center. Electropotential differences exist between the front and rear of the eyeballs, and small electrical impulses arise when the eyeballs move. Electronystagmographic recordings are made after irrigation by picking up these impulses with electrodes placed on the surface of the subject's body, one at the outer corner of each eye, and one in the middle of the forehead, the latter being used as a reference potential. Such potentials are saw-toothed in shape, having a frequency, intensity, and duration that depends on the particular state of the subject's inner ear and the nerve interconnections therewith.

The present invention is directed to an improvement in such operations wherein control of the irrigation interval and the detection of the resultant surface potentials are greatly simplified to remove much of the art from electronystagmography and permit the imposition of precise controls thereon.

In accordance with the invention, a supply including a liquid supply of predetermined temperature having a conduit with a control valve therein and with a nozzle thereon is provided to irrigate the ear of a subject. Detector means are provided for sensing the surface potentials across predetermined points in the region of the patient's eyes. A registering means is provided for recording the selected electrical function of the potentials. Timing means are provided automatically to initiate and terminate fluid flow to the subject's ear for a predetermined irrigation interval and for actuating the registering means immediately following the irrigation interval.

In a further aspect of the invention, means are provided for registering the period between the irrigation intervals. In a more specific aspect, first and second timers are provided to suppress as well as facilitate registration of the amplified potentials across predetermined points adjacent the patient's eyes.

For a more complete understanding of the invention and for further objects and advantages thereof, reference may now be had to the following description taken in conjunction with the accompanying drawings in which:

The drawing is a schematic diagram of a system embodying the present invention.

An electronystagmograph embodying the present invention is shown in the FIG., wherein a subject 10 is fitted with electrodes 12, 13 and 14, and is also fitted with an irrigation tube 15. In accordance with electronystagmography, cold water is caused to flow through the outer ear by means of tube 15. Surface potentials detected between the electrodes 12 and 13 and between electrodes 12 and 14, respectively, are then sensed, amplified and counted. Such a recording facilitates the study of different characteristics of nystagmus, for example, duration, speed, amount and intensity. The number of cycles of the detected voltage per unit time over an extended recovery period following termination of the flow of the cold water provides one measure of the sensitivity of the inner ear to liquid flow therein.

In accordance with the invention, a sensitive and optimized amplifier system is provided wherein the amplifier 20 comprises three stages of push-pull amplification employing low noise transistors. The first stage uses transistors 21 and 22. The second stage employs transistors 23 and 24, and the output stage employs transistors 25 and 26. The transistors are coupled to B+ and B− terminals of a suitable power supply by conventional circuits.

The electrodes 12—14 are connected to the amplifier input terminals 27, 28 and 29, respectively. The input circuit to the amplifier includes an RC network 30 connected between terminals 28 and 27 and RC network 31 connected between terminals 29 and 27.

The common emitter terminals 32 of transistors 21 and 22 are connected to the reference terminal 27 by way of resistor 33. Similarly, the common emitter terminals of each of transistors 23 and 24 are connected to the reference terminal 27 by way of resistor 34. The collectors of transistors 21 and 22 are coupled to the base terminals of transistors 23 and 24, respectively, by capacitors 35 and 35a, respectively. The collector terminals of transistors 23 and 24 are connected directly to the base terminals of transistors 25 and 26.

A capacitor 36 is connected in shunt across the base terminals of transistors 25 and 26. The emitter terminals of transistors 25 and 26 are connected to the reference terminal 27 by way of resistors 37 and 37a, respectively. The emitters of transistors 25 and 26 are also coupled by way of resistors 38 and 39, respectively, to the inputs of a single ended buffer amplifier 40. Preferably the preamplifier will have a differential input with an impedance greater than 100,000 ohms. The frequency response is set so that signals from 1 c.p.s. to 50 c.p.s. are amplified. In one embodiment, the first two stages combined to give an overall gain of 50,000 and were followed by an emitter follower with an input impedance of 2,000 ohms. The common-mode rejection of the input circuit was about 50,000 to 1. The capacitor serves to filter all unwanted noise and other signals entering the amplifier allowing only the desired input signal to pass. Coupling between stages in the preamplifier with large capacitors, such as capacitors 35 and 35a, provides an amplifier with almost DC characteristics and yet gives all the advantages of an AC coupled circuit with the improved stability of AC operation.

The output channel from buffer amplifier 40 comprise conductors 41 and 42. Conductor 42 is connected directly to a signal input terminal 45b associated with a recorder system 44. Conductor 41 is further connected by way of a pair of selected circuits through a pair of relays R1 and R2 so that the time intervals during which the signal will effectively be applied to the signal input terminal 45b may be controlled.

A control system 50 cooperating with amplifier 20 is employed automatically to program operations on subject 10 with the time intervals during which each of several operations follow being selectively variable by manually operable timers. The system functions to prevent the signals from conductors 41 and 42 from being effectively recorded in the unit 44 during the time interval that fluid is being employed to irrigate the subject's ear, yet provides for recording the time intervals in which irrigation is continued. On discontinuance of irrigation, the system then serves to apply the signals from conductors 41 and 42 to the recorder to provide an output chart 45 on which both the irrigation time and the output signals are recorded. At the same time, signals from conductors 41 and 42 are applied to a counter 46 which may be provided with a suitable tape printout to record the number of excursions per unit interval during the period that the signals are being recorded on the chart 45.

The circuit configuration and the elements employed in the control system 50 will now be described, following which the operation thereof in conjunction with the amplifier 20 will be explained.

The system employs a pair of tanks 51 and 52. Water in tank 51 is maintained at a temperature of 30° C. Tank 51 thus supplies a cool fluid employed to irrigate the subject's ear. Tank 52 contains water which is maintained at a temperature of 44° C and may be employed to irrigate the ear of the subject during a different sequence. The precise sequence of such successive operation will depend upon the subject and the operator and the objectives of the test. In accordance with one mode of operation, two cycles of irrigation with the water from tank 51 are completed, following which two cycles of irrigation employing water from the warm tank 52 are used. Furthermore, a calibration system is provided that is manually operable by using manual overrides (not shown) and employs a calibrate signal generator 53.

The control system 50 is supplied with power by way of lines L1 and L2. In the calibration system lines L1 and L2 are connected to the primary of a stepdown transformer 54. The secondary winding of transformer 54 is connected by way of conductor 55 to one terminal of two calibration lights 56 and 57. The other terminals of lights 56 and 57 are connected to a single pole double throw switch 58. The switch 58 is operated under the control of a cam 59 which is driven by a motor 60. Motor 60 is energized by closure of switch S2 which connects the motor 60 directly across lines L1 and L2. With switch S2 closed, the motor 60 drives cam 59 preferably to turn lights 56 and 57 on and off alternately at one second intervals. The subject 10 is then asked initially to follow with his eyes the actuation of the lights 56 and 57. The lights are mounted at laterally spaced points. The excursions of the eyes thus produced are sensed and recorded and the system is initially calibrated to secure clearly identified signal levels.

Aside from the foregoing calibration operation, the rest of the system may be automatic to provide a preset irrigation interval followed by a preset measuring interval. The operation is carried out through the combined use of three multichannel relays R1, R2, and R3 and two manually adjustable timer units TD1 and TD2.

One terminal of the coil is relay R1 is connected directly to line L2. The other terminal of relay R1 is connected by way of a foot-actuated switch S1 to line L1 Thus, when the foot pedal 65 is depressed, switch S1 is closed and the coil for relay R1 is energized, closing the four switches associated therewith. The line 64 from switch S1 and relay R1 is also connected to terminal 65 of timer TD2. The switch 66 on relay R1 is connected directly to line L1. Switch 67 is connected by way of switch S3 to line L2. Switch 68 is connected by way of conductor 73 to a first switch 70 on relay R2. Switch 69 is connected by way of conductor 74 to a second switch 71 on relay R2. The normally opened terminal for switch 66 is connected by way of conductor 75 to switch 81 of timer TD1 and to one terminal of the solenoid 80 of timer TD1, and also to one terminal of the solenoid 85 of timer TD2 and to the switch 83 of timer TD2.

The normally open terminal of switch 67 is connected by way of conductor 86 to the motor 87 which drives the chart in the recorder 45. The other terminal of motor 87 is connected to line L1.

The normally closed terminal of switch 68 is connected by way of conductor 88 to one of the gate terminals 46a on the counter 46. It is also connected by way of conductor 89 to the normally open terminal of switch 70 of relay R2. The second of the counter gate terminals 46a is connected by way of conductor 90 to conductor 73. Thus, when relay R1 is not energized, there is a short circuit across the counter gate terminals 46a which prevents the counter from registering. Similarly, when the relay R2 is energized, a short circuit is present by reason of closure of switch 70. However, when relay R2 is deenergized and relay R1 is energized, there is no short circuit and the signals from lines 41 and 42 will register on the counter 46. It will be noted that a capacitor 46d is connected in series with a resistor 46e and that the series circuit bridges the gate terminals 46a of the counter 46. The series circuit provides for transient suppression and eliminates any count from being accumulated in counter 46 while the fluid is flowing.

The normally closed terminal of switch 71 is connected by way of line 95 to one of the signal input terminals 45a of the recorder 45 and to one of the signal input terminals 46b on counter 46.

The normally open terminal of switch 72 is connected by way of line 96 and a bias voltage source 97 to one of the mark signal input terminals 45b of the recorder 45. The switch 72 is connected to the second of the mark signal terminals 45b. When the switch 72 is closed by energization of relay R2, the voltage from a source, such as battery 97, is applied to one of the two recorder channels and causes the right-hand pen on the recorder 45 to deflect, thus providing a clear indication of the irrigation time interval.

The time delay control units TD1 and TD2 are identical in construction. Unit TD1 controls the time interval of fluid flow through channel 15. The timer TD2 controls the total period of time from the start of irrigation to the end of the testing period.

In the timer TD1, the motor 100 is connected at one terminal to line L2 and to one terminal of the relay coil 80. The relay coil 80 controls two switches, 81 and 82. The switch 82 is connected to line L1 by way of conductor 104. When the relay 80 is energized, the switches 81 and 82 are actuated to energize the motor 100 and to apply a voltage, by way of switch 66, terminal 81 and line 101, to the switch 102 on relay R3. The timer operates such that when the preset time interval therein has expired, the motor, coupled by way of linkage 105 to the switches 81 and 82, returns them to their normally open position.

In timer TD2 power is supplied from line 1 by way of conductor 106 and switch 84 to motor 107. The second terminal of motor 107 is connected to line L2 by way of line 108. Line 108 is also connected to one terminal of the relay coil 85. The second coil of relay 85 is connected by way of line 109 to switch 83 and to one terminal of relay coil 80 and unit TD1 and to switch 81 of unit TD1.

A third relay R3 is provided with switches 102 and 103. As previously mentioned, power is supplied by way of switch 102 in its open circuit position and through line 110 to one terminal of a valve solenoid 111. The second terminal of solenoid 111 is coupled by way of line 112 to line L2. It will be remembered, however, that power appears on line 101 and at switch 102 only when relay coil 80 and unit TD1 is energized. The solenoid 111 is coupled by way of linkage 113 to a valve 114 in the flow line leading from the cold water unit 51 to the flow channel 15.

When the solenoid 111 is energized, the valve 114 is actuated to initial flow into the subject's ear. When the solenoid is deenergized, the flow is abruptly terminated. It will be noted that switch 103 in relay R3 is coupled by way of line 115 to an indicator lamp 116. When lamp 116 is energized by current flow through switch 103, it will indicate that relay R3 is not energized and that any flow in response to actuation of the entire system will be from the cool water tank 51.

Switch S4 leading from line L1 to the coil of relay R3 may be manually actuated. When actuated, switches 102 and 103 are moved to condition the system for flow from the tank 52 by energizing valve solenoid 117 under the control of the unit TD1. In the latter case, the indicator light 117 will be energized to indicate that any flow in the system will be from tank 52.

It will be noted that a capacitor is connected to each of the coils or relays R1—R3 and in the timers TD1 and TD2 for suppression of unwanted transients in the system during switching operations.

Having described the construction of the system, it will now be recognized that the sequence of operations involves first attaching the electrodes 10—14 to the subject's brow. Thereafter, the irrigation tube 15 is placed in the subject's ear. Calibration procedures employing the calibration unit 53 may then be initially carried out to make adjustments as may be necessary to make certain that the electrodes are properly in place and that noise signals therefrom are at a minimum.

Thereafter, if cold water is to be employed, the switch S4 will be placed in the open position as illustrated in the FIG. The time interval during which the cold water to be circulated is manually set by adjusting the timer TD1. The interval encompassing the irrigation period as well as the measuring period is then manually set by adjustment of the timer TD2.

With the system thus conditioned, the foot switch 65 is depressed, closing switch S1. This promptly closes relay R1. Relay R1 then supplies power by way of switch 66 to both of the coils 80 and 85 of units TD1 and TD2, respectively. Thus, the motors 100 and 107 begin to run. Power is supplied by way of switch 81 to a relay coil of relay R2 and to switch 102 to energize the valve solenoid 111. At the same time, power from switch 66 is applied by way of switch 83 to the second 111 of the relay R1 to hold relay R1 closed so long as the unit TD2 is actuated.

In the foregoing condition, the system remains unchanged throughout the irrigation interval fixed by the timer TD1. So long as the relay R1 is energized, power is supplied by way of switch 67 to the motor 87 of the recorder 45, causing the chart to move past the pens while the fluid is flowing in the subject's ear. So long as the relay R2 is energized, the battery voltage from the battery 97 is applied to the marker unit to apply a step function 119 to the right-hand trace on the recorder chart 45c. During the irrigation interval, switch 71 is open so that no signal can be applied to the signal terminals 45a of the recorder 45 and terminals 46b of counter 46.

At the end of the irrigation interval, switch 81 opens, deenergizing relay R2 and, simultaneously, the solenoid 111. When relay R2 is deenergized, switch 71 returns to its normally closed position completing the signal circuit through switches 69 and 71. Thus, signals are recorded only at the end of the irrigation interval. The signal 120 is shown on the left-hand trace on the recorder chart 45a.

In practice, the timer TD1 is set for a preselected interval between 0 and 60 seconds. The timer TD2 is set for a combined irrigation and measuring interval of up to 5 minutes. Thus, a two trace chart is provided to show not only the times involved but also the waveforms of the received signal.

In counter 46 is registered each excursion of the signal on lines 41 and 42. The contents of the counter are periodically printed out, and the counter reset at selectable intervals. A chart 130 having the number of counts per unit of time printed thereon thus issues from the counter 46 to provide a second record of the performance of the subject.

In one embodiment of the system, the timer units TD1 and TD2 were of the type identified as series MTD automatic reset time delay timers manufactured and sold by Industrial Timer Corporation of Los Angeles, California. Unit TD1 was an MTD-6OS unit and TD2 was an MTD-5M unit.

Counter 46 was of the type manufactured and sold by Anadex Instruments, Inc. of Van Nuys, California and identified as Model No. CF-203-4R Frequency Counter with Option O (10 second gate time) and Option J (10 line printer output).

The recorder was of the type manufactured and sold by Texas Instruments Incorporated of Dallas, Texas and identified as Model PICAH Oscillo-Riter Recorder.

Having described the invention in connection with certain specific embodiments thereof, it is to be understood that further modifications may now suggest themselves to those skilled in the art and it is intended to cover such modifications as fall within the scope of the appended claims.

We claim:

1. An electronystagmograph wherein a supply of liquid of predetermined temperature is provided for irrigating the ear of a subject under control of a valve and wherein electrodes adapted to be attached to the subject in the region of the subject's eyes measures surface potentials produced by movement of the eyes in response to such irrigation, the combination of which comprises:
    a. a low noise, high-gain amplifier responsive to signals in the range of from about 1—50 c.p.s. connected at its input to said electrodes and having an output channel,
    b. a recorder having a signal input terminal,
    c. a first relay having associated therewith a normally opened switch,
    d. a second relay having associated therewith a normally closed switch,
    e. an electrical latch system including said normally opened switch and said normally closed switch connected in series between said channel and said signal input terminal,
    f. precision timer means for actuating said first and second relays at the beginning of a desired irrigation interval and for opening said normally closed switch at the end of said irrigation interval to apply said signals to said recorder during a measuring interval following said irrigation interval, and
    g. circuit means responsive to said timer means for actuating said valve to initiate flow simultaneously with actuating of said relays and for actuating said valve to terminate said flow simultaneously with deenergization of said second relay.

2. The combination set forth in claim 1, wherein said supply of liquid includes a warm subsupply and a cold subsupply, and relay means for directing flow of irrigating liquid from said warm subsupply or from said cold subsupply.

3. The combination set forth in claim 1 when said recorder comprising:
    a chart recorder,
    a counter-printer connected in parallel with said chart recorder and
    wherein a count inhibiting condition is applied to said counter-printer when first relay is deenergized and when said second relay is energized.

4. The combination set forth in claim 3 wherein:
    said first relay includes a circuit for applying drive power to said chart recorder for driving said recorder without interruption through both said irrigation interval and said measuring interval.

5. The combination set forth in claim 1 wherein said recorder is a pulse counter-printer with a repetitive time gate which is short compared with said measuring interval and in which the number of excursions during each time gate is registered.

PO-1050
(5/69)

UNITED STATES PATENT OFFICE
CERTIFICATE OF CORRECTION

Patent No. 3,563,231     Dated February 16, 1971

Inventor(s) Behrman A. Ducote, et al

It is certified that error appears in the above-identified patent and that said Letters Patent are hereby corrected as shown below:

Col. 3, line 32, "is" should read --in--; Col. 5, line 10, "lll" should read --terminal--.

Signed and sealed this 15th day of June 1971.

(SEAL)
Attest:

EDWARD M. FLETCHER, JR.          WILLIAM E. SCHUYLER, JR.
Attesting Officer                Commissioner of Patents